United States Patent [19]

Davis

[11] 4,441,806

[45] Apr. 10, 1984

[54] DOCUMENT EXPOSURE APPARATUS

[75] Inventor: James W. Davis, Richardson, Tex.

[73] Assignee: The Mead Corporation, Dayton, Ohio

[21] Appl. No.: 356,016

[22] Filed: Mar. 8, 1982

[51] Int. Cl.³ .................................. G03B 27/32
[52] U.S. Cl. ............................ 355/23; 271/195
[58] Field of Search ............... 355/23, 75, 76; 271/195, 211

[56] References Cited

U.S. PATENT DOCUMENTS

| | | | |
|---|---|---|---|
| 3,276,425 | 10/1966 | Rabb | 271/195 |
| 3,591,281 | 7/1971 | Kruhlinski | 355/49 |
| 3,800,432 | 4/1974 | Miyata et al. | 271/195 |
| 3,844,653 | 10/1974 | Kelly | 355/8 |
| 3,844,654 | 10/1974 | Guenther | 355/24 |
| 3,971,554 | 7/1976 | Stange | 271/195 |
| 4,062,538 | 12/1977 | Stange et al. | 271/195 |
| 4,110,030 | 8/1978 | Knechtel | 355/11 |
| 4,226,526 | 10/1980 | Spence-Bate | 355/53 |
| 4,295,732 | 10/1981 | Hull et al. | 355/14 R |
| 4,319,833 | 3/1982 | Hidding | 355/23 |

FOREIGN PATENT DOCUMENTS

2921008 11/1980 Fed. Rep. of Germany ...... 271/195

Primary Examiner—Monroe H. Hayes
Attorney, Agent, or Firm—Biebel, French & Nauman

[57] ABSTRACT

Document exposure apparatus for a document copier is disclosed. Selectively, either the front or both sides of a document may be copied. Automatic transport apparatus first passes the document by a first optical scanning station from which signals representative of the front side of the document are obtained by a scanner. The document is then transported so as to engage a rotating drum. When only front side copying is desired, fingers of a solenoid actuated gate remove the document from the drum after a partial revolution is made and the document is passed to a receiving tray. When it is desired to copy both sides of a document, the gate is first lifted from the drum allowing the document to continue rotation with the drum so as to present the back side of the document, with the document traveling in the opposite direction, to a second scanning station to which the scanner has now moved, for copying the back side of the document. The document then travels with the drum to the gate the second time at which instance the gate has been lowered to the drum so that this time the document is removed from the drum and the document is then passed to the receiving tray.

8 Claims, 10 Drawing Figures

DOCUMENT EXPOSURE APPARATUS

BACKGROUND OF THE INVENTION

The invention relates to apparatus for optically exposing documents for copying. More particularly, it relates to an exposure system for automatically copying either one or both sides of a sheet document.

A typical prior art device is illustrated by Kelly U.S. Pat. No. 3,844,653 in which a scanner is shown that has a simplex scanning station and a duplex scanning station. Document side reversal is by a rotating drum in which the first exposed side is positioned next to the drum surface thus placing on the outside of the drum the unexposed side for exposure. Knechtel U.S. Pat. No. 4,110,030 discloses a document inverter in which transport rolls position and move a document behind an exposure window exposing one side of the document. A control device is provided for reversing the rotation of the transport roll pairs before the original leaves the roll pair adjacent the exit and, as a result, the roll after reversal of the rotation thereof transports the original document again past the exposure window only this time the back, or other, side of the document is exposed.

SUMMARY OF THE INVENTION

The invention provides document exposure apparatus comprising means for directing sheet-type original documents successively past two exposure stations and means for reversing the document between the two stations. Scanning may be accomplished by a suitable scanner which moves back and forth between the two exposure stations.

The apparatus of this invention presents an original document to a first scanning station and then alternatively either transports the document to an output tray or to a second scanning station followed by movement of the document to the output tray. A document transport assembly hingedly connected to the frame of the apparatus is contained within a lid also hinged to the frame. The transport apparatus transports an original document in a first direction past the first scanning station and continues movement of the document generally in the first direction toward an output tray. A rotatable document reversing drum, also hingedly connected to the frame is housed within the lid separate from the document transport assembly.

The drum receives a document from the transport means, and by rotation inverts the document and transports it in a second direction opposite the first direction and presents it to the second scanning station. The drum then returns the document to the document transport assembly for movement to the output tray. A gate, selectively movable, directs a document from the transport assembly either to the second scanning station or to the output tray.

A latch mechanism enables the lid to be hinged upwardly either alone, or together with the transport assembly.

DETAILED DESCRIPTION

Figure 1:
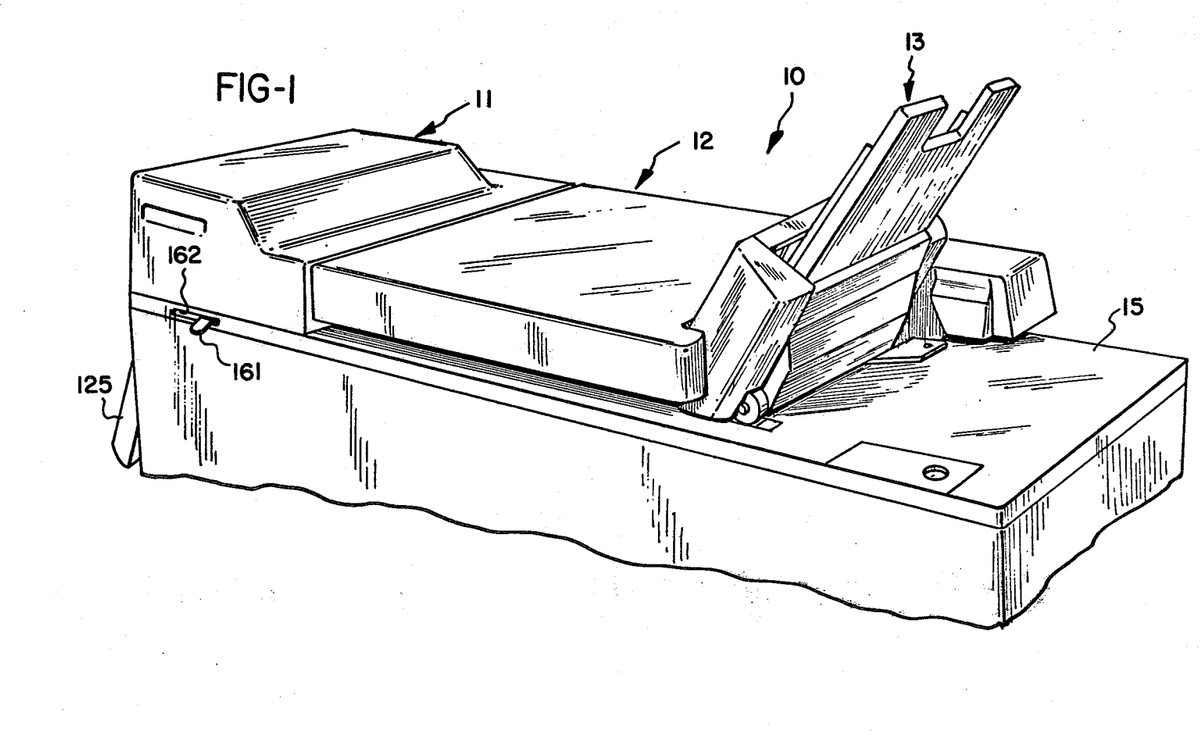
FIG. 1 is a representative pictorial view of a document scanning system.
Figure 2:
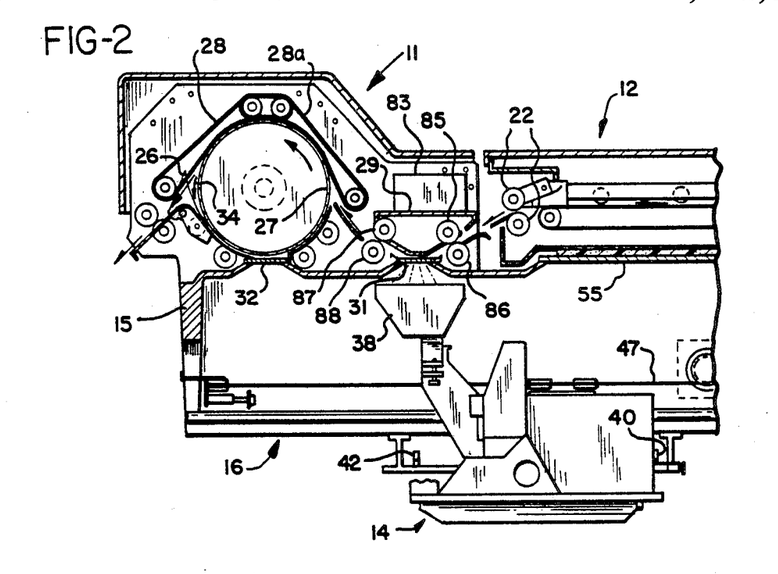
FIG. 2 illustrates the position of a scanner carriage assembly for scanning the front side of a sheet-type original document.

A document scanner having an optical exposure system in accordance with the present invention may be constructed as generally illustrated pictorially in FIG. 1 and in vertical section in FIG. 2. As illustrated in FIGS. 1 and 2, a document scanning system 10 may comprise a scan station assembly 11, a platen cover 12, a document feeder assembly 13, all supported by a frame 15, and a scanner carriage assembly 14 supported by internal frame 16 mounted in turn to frame 15. Document exposure occurs either at a platen 55 or at a first exposure station defined by scan glass 31. In either case, scanning is performed by optical elements mounted upon scanner carriage 14.

Scan glass 31 is utilized for front side scanning of automatically fed sheet-type original documents, while platen 55 is used for exposure of either sheet-type or bulky original documents. Platen cover 12 is hinged to accommodate exposure of bulky documents.

Document scanning system 10 also comprises a second exposure station defined by scan glass 32. The second exposure station is provided in order to accommodate reverse side scanning of automatically fed sheet-type documents, thereby automatically providing scanning information from duplex documents. Automatic feeding of sheet-type documents is carried out as hereinafter described such that the documents pass through the second exposure station in a direction which is opposite to the direction of passage through the first exposure station.

Scan glass 31, scan glass 32 and platen 55 are all positioned in a common plane for scanning by scanning elements carried by scanner carriage 14. The scanner elements are adjusted for optical focusing at the common plane, and scanner carriage 14 is supported for linear motion along a path parallel to the plane so defined.

Document scanning system 10 is equipped with operator controls (not illustrated) which enable selection of either a manually initiated scanning mode (platen scanning) or an automatic document handling mode. Other controls are provided for selecting either one or two side scanning, selecting appropriate document size, and entering various control commands as appropriate for operating the scanning system and controlling the associated printer. A data processing system (not illustrated) provides control commands for the document scanning system of this invention and receives the scanning information which is produced. The scanning information is processed and stored for use in generating printing control signals.

It will therefore be seen that a document scanning system in accordance with this invention has the following four different operating modes:

Mode I—Manually initiated scanning of bulky documents (platen cover 12 raised).

Mode II—Manually initiated scanning of sheet-type original documents (platen cover 12 closed).

Mode III—Automatic feeding and single side scanning of sheet-type original documents.

Mode IV—Automatic feeding and two-side scanning of sheet-type original documents.

As illustrated in FIG. 2, document scanning system 10 is operating in one of the automatic feeding modes. Moreover, the system is illustrated during that portion of a scanning cycle when the front side of a sheet is being scanned. At that particular time, scanner carriage 14 is positioned such that the scanning optics are directly below scan glass 31. During Mode IV, scanner carriage 14 is driven back and forth between positions under scan glass 31 and scan glass 32. For operation in Mode III, scanner carriage 14 remains fixed at the position illustrated in FIG. 2.

Figure 3:
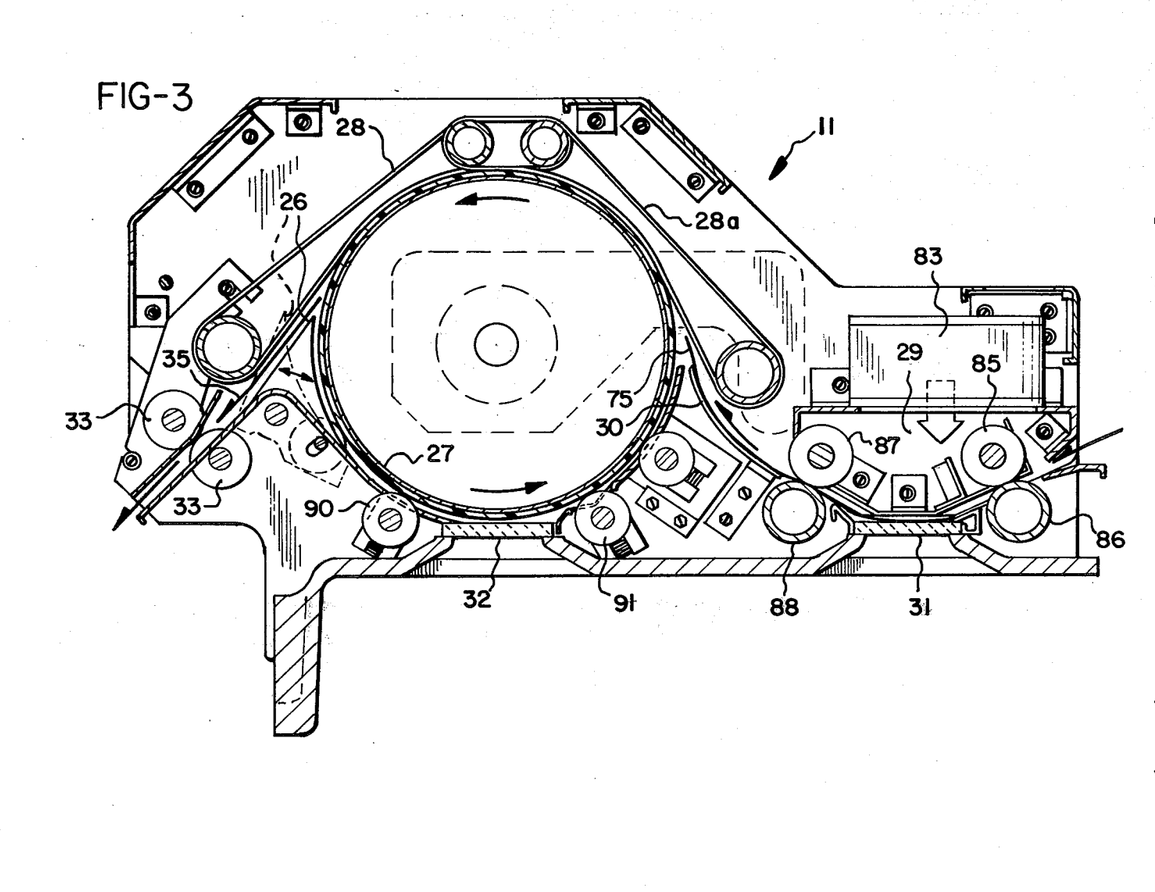
FIG. 3 is an enlarged sectioned side elevation view of a scanning station assembly.
Figure 4:
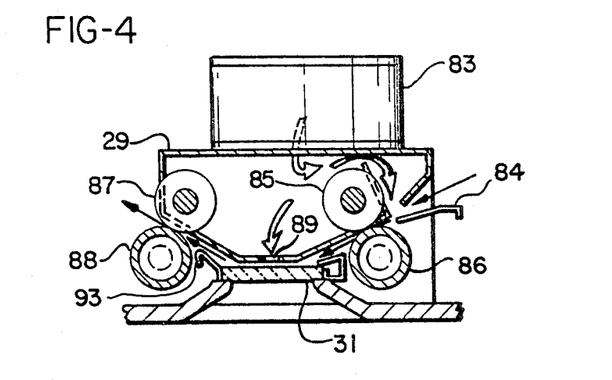
FIG. 4 is an enlarged view of a scanning station for simplex copying.

The description of the preferred embodiment will now continue with a description of scan station assembly 11, as further detailed in FIG. 3, which receives sheet-type documents from rollers 22 mounted within platen cover 12. The documents 75 are received by rollers 85 and 86 are delivered into a narrow gap between the lower surface of a plenum chamber 29 and the upper surface of scan glass 31. Passage of the documents through this gap is assisted by flowing air as generally illustrated in FIG. 4. A fan mounted within fan box 83 provides a flow of air into plenum chamber 29 for outward passage around roller 85 toward a guide member 84. Roller 85 is a segmented roller, so that the flowing air is carried into the nip between roller 85 and roller 86. This flow of air progresses toward scan glass 31, where it joins other air provided directly from the interior of plenum chamber 29 via an opening 89 juxtapositioning a document to scan glass 31. Thereafter, the combined air flow carries documents 75, directed by guide member 93, through the nip between rollers 87 and 88. Roller 87 is also segmented to provide a path for the flowing air.

After passage through the first exposing station, as above described, documents are delivered to drum 27 for transportation either to the second exposing station defined by scan glass 32 or to a pair of exit rollers 33, depending upon whether two-side or one-side scanning is desired. Documents are guided toward drum 27 by guide member 30 and are gripped against the drum by a set of cooperating guide belts 28 and 28a. (See FIGS. 3, 5, and 6.) Drum 27 is preferably covered by a white elastomeric material 78 (see FIG. 8).

Figure 8:
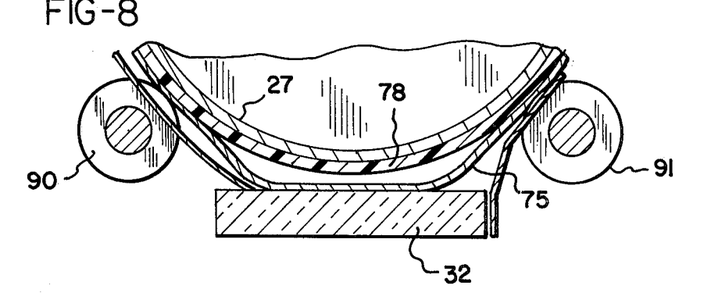
FIG. 8 is an enlarged view of a duplex scanning exposure station.

Scan station assembly 11 includes a selectively actuatable, movable gate 26 which may be positioned adjacent drum 27 or opened to the position illustrated in FIG. 2. (Also shown open in phantom in FIG. 3.) When gate 26 is in the opened position, documents follow the path indicated by arrow 34. This causes the documents 75 to follow drum 27 around to scan glass 32 for exposure as illustrated in FIG. 8. It will be noted that documents 75 approach scan glass 32 in an inverted position. That is, the side of each document which is presented to scan glass 32 is opposite the side previously presented to scan glass 31. Furthermore, the document moves in opposite directions with respect to the scan glasses during the two exposures, while presenting the same leading edge of the document to each scan glass, so there is no top-to-bottom reversal of the scanning data. There is, however, a left-to-right image reversal, which is readily accommodated by the data handling system.

Referring now to FIG. 8, it will be seen that documents 75 pass between drum 27 and roller 90 enroute to scan glass 32. After passing roller 90, documents 75 tend to bulge outwardly away from drum 27 for flattening alongside scan glass 32. This is due, in addition to document stiffness, to the relatively soft resilient cover 78 being deformed slightly by the relatively hard roller 90 and this enables sharp focussed scanning by the scanning optics. Preferably, drum 27 is positioned so as to provide a gap of about 0.75 millimeters between its elastomeric covering 78 and scan glass 32.

After passage past scan glass 32, documents 75 are deflected upwardly toward roller 91 and other rollers and guide members until they reach belts 28 and 28a for a second time. Thereafter, the system controller closes gate 26. In its closed position, preferably, gate 26 is positioned so as to provide a clearance of about 0.25 millimeters between the tips thereof and the surface of drum 27, so as not to interfere with rotation of drum 27. When document 75 reaches gate 26 for the second time, gate 26 then strips the document 75 away from drum 27 for movement in the direction indicated by arrow 35. This directs the document toward exit rollers 33, and thence on to the original document receiving tray 125. In simplex copying, gate 26 remains closed and documents are stripped from drum 27 on their first pass.

Scanner carriage 14 transports an illuminator 38 along a path with respect to the common plane of scan glass 31, scan glass 32, and platen 55 and causes a bright line of illumination to be focussed upon the surface of the document being scanned. An image of a portion of the document which is so illuminated is reflected backwardly toward suitable optical elements and an array of photosensing elements mounted within carriage 14.

Figure 5:
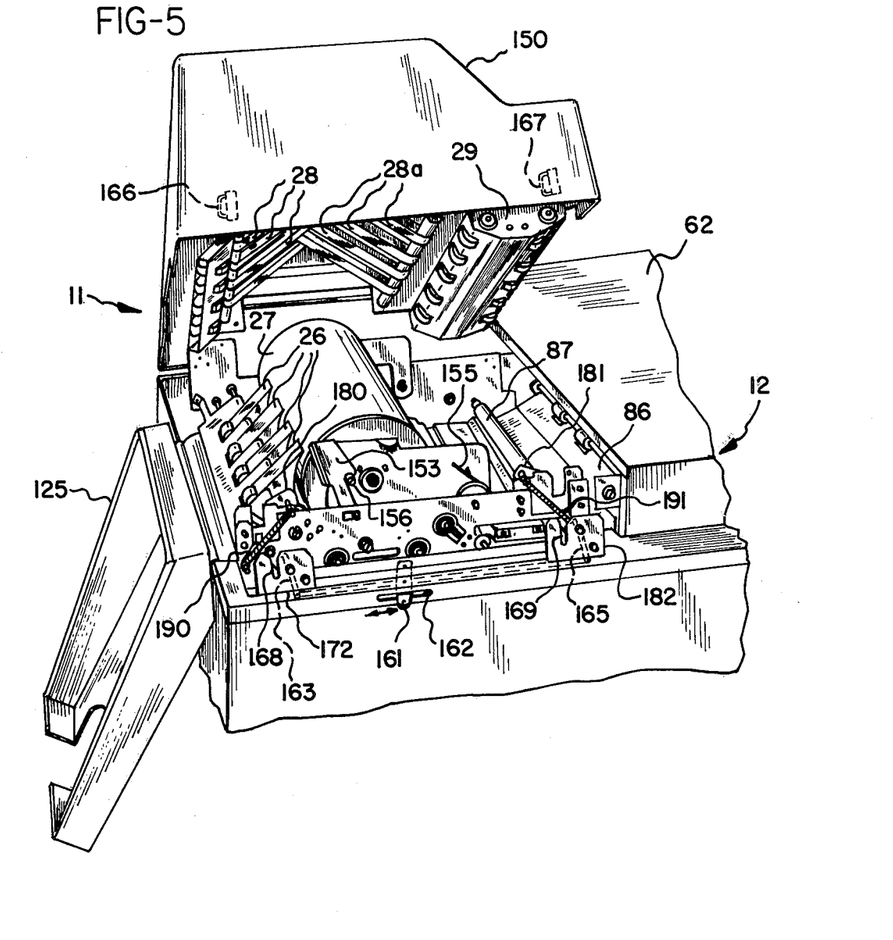
FIG. 5 is a pictorial illustration of a scanning station assembly as shown in FIG. 1 with the cover raised.
Figure 6:
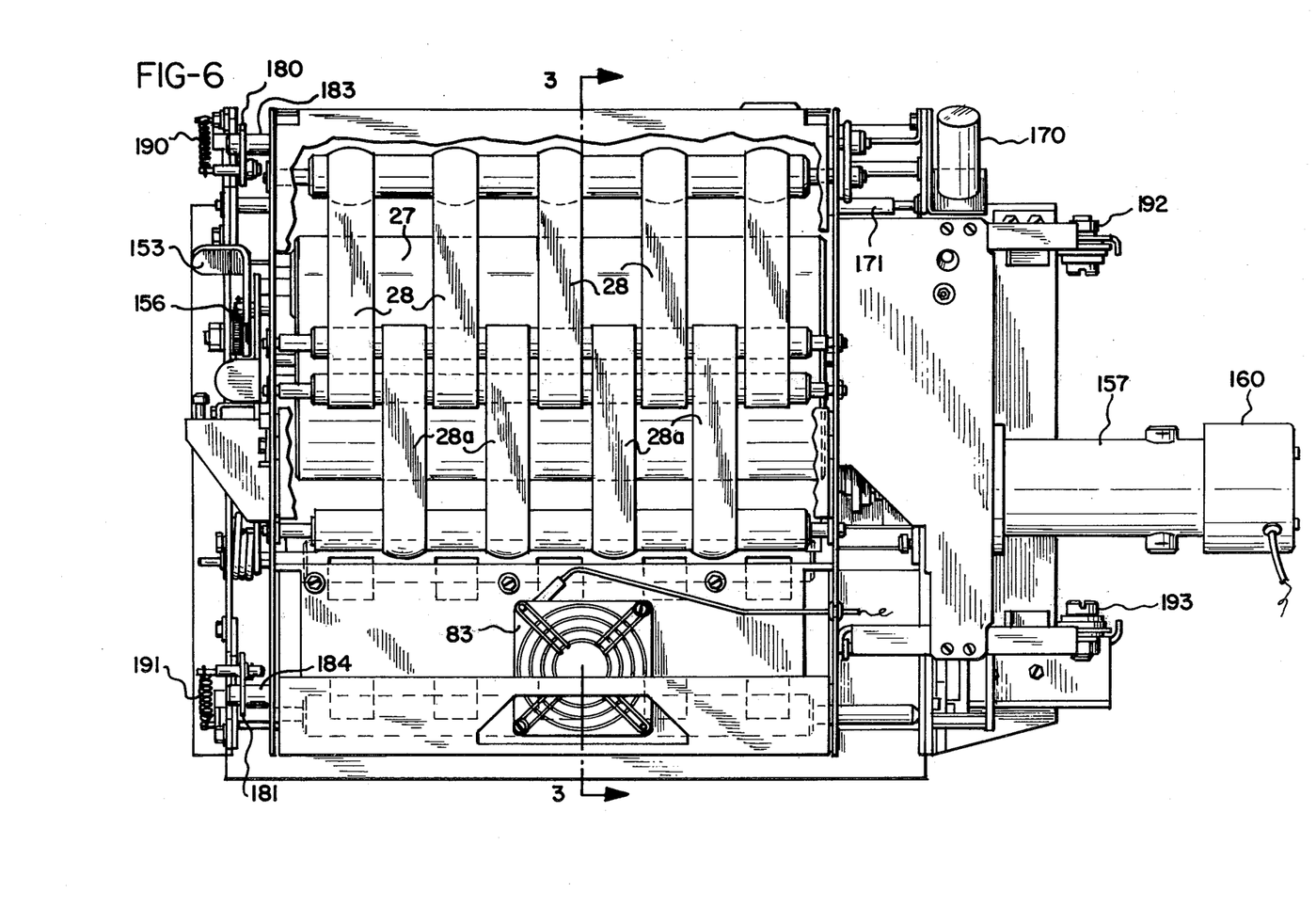
FIG. 6 is a plan view illustrating a rotating drum inverter mechanism.

To further detail the description of an embodiment of the invention, reference is made to FIGS. 1, 5, 6, 7, 9, and 10. Scanning station 11 is fabricated such that the lid 150 and all scanning and transport mechanisms above the paper level path for single side scanning (simplex path) may be lifted as illustrated in FIG. 5. This provides for easy clearance of any paper jams. FIG. 5 also illustrates how the fingers of gate 26 interleave the belts 28 that are on the output side of the drum 27.

To raise lid 150, lever 160 is moved in slot 162 so as to remove latch levers 163 and 165 from locking engagement with catches 166 and 167 residing, when the lid is closed, in slots 168 and 169 located in brackets 172 and 182. The lid is then manually lifted about pivotal axis 200 to the upright position as illustrated in FIG. 7.

Figure 7:
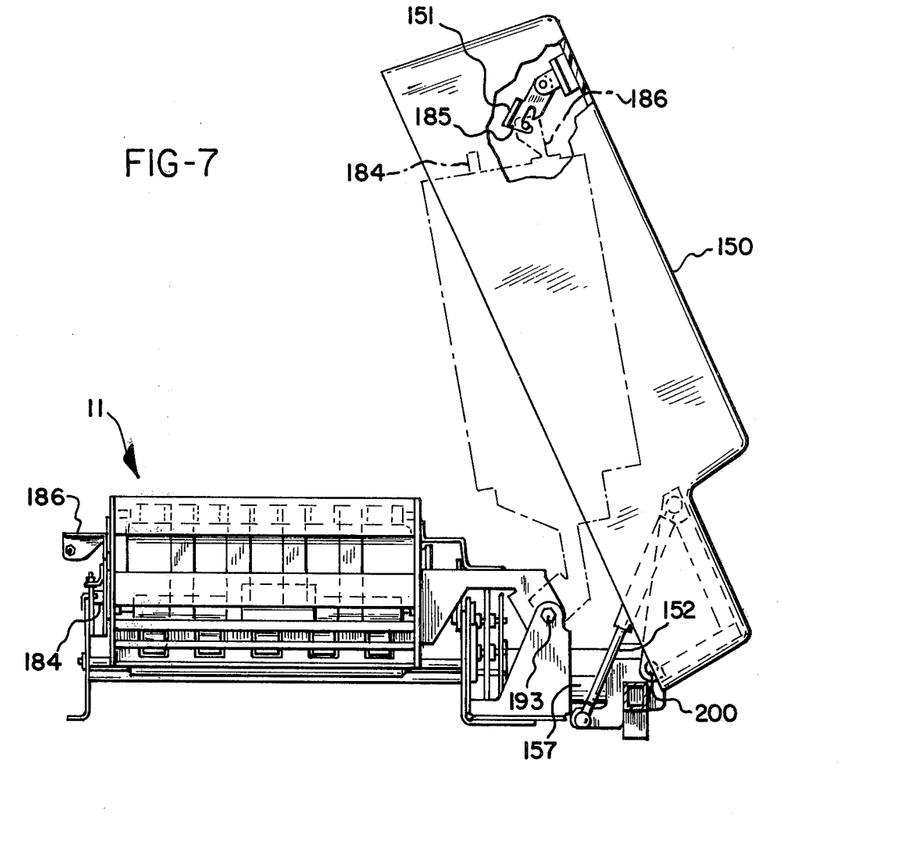
FIG. 7 is an end elevation view of a scanning station as illustrated pictorially in FIG. 5.

The transport mechanism, under normal circumstances, is lifted along with lid 150 as illustrated in FIG. 5, and in phantom in FIG. 7. A catch pin 185, mounted to bracket 186 which is in turn mounted to the transport mechanism, is latched to swinging holder 151 attached to lid 150. The action of hand raising lid 150 raises catch rods 183 and 184 against spring loaded latches 180 and 181, having springs 190 and 191, respectively. Release of catch rods 183 and 184 by latches 180 and 181 is resisted by springs 190 and 191 until the rods 183 and 184 are partially released. Latches 180 and 181 then push catch rods 183 and 184 to facilitate their release therefrom. The transport mechanism may then be pivoted upward about hinge points 192 and 193.

In lowering lid 150, and thus the transport mechanism, catch rods 183 and 184 are pressed against latches 180 and 181 by direct contact with lid 150. Rods 183 and 184 are caught by latches 180 and 181, and the transport mechanism is pulled down and seated, away from the inside surface of lid 150. Thus, external loads on lid 150 during machine operation will not affect document transport reliability.

Latch 151 is releasable such that lid 151 is raised separately from the transport mechanism to facilitate servicing thereof.

A pair of gas springs 152 (only one illustrated) aid in raising and holding the lid and associated mechanism.

Figure 9:
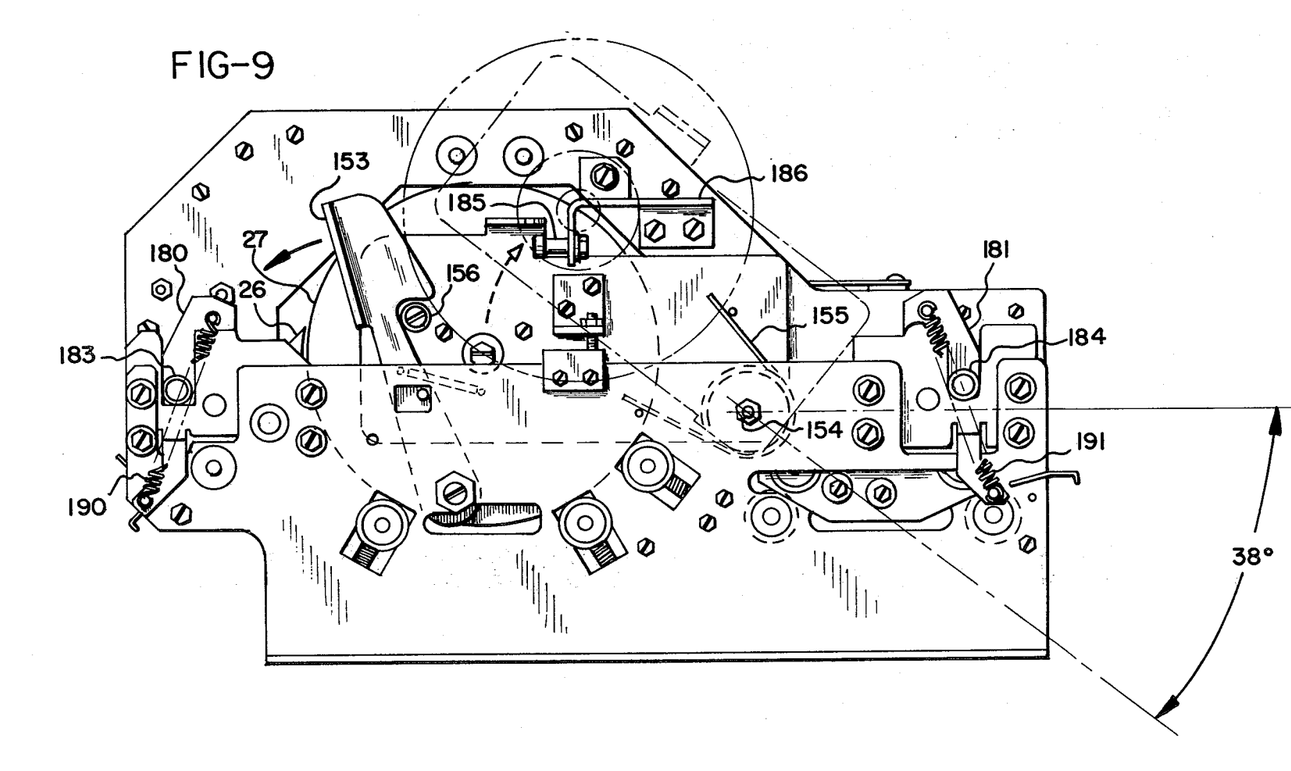
FIG. 9 is a side elevation view of a scanning station assembly.

Paper jams at or in the vicinity of the duplex scan glass 32 may be cleared by releasing drum retaining latch 153 from latch catch 156 and pivoting the drum assembly up through an angle of approximately 38° as illustrated in FIG. 9. The upward pivoting of drum assembly 27 about pivot hinge 154 is assisted by helical springs 155. (Only one illustrated.)

Figure 10:
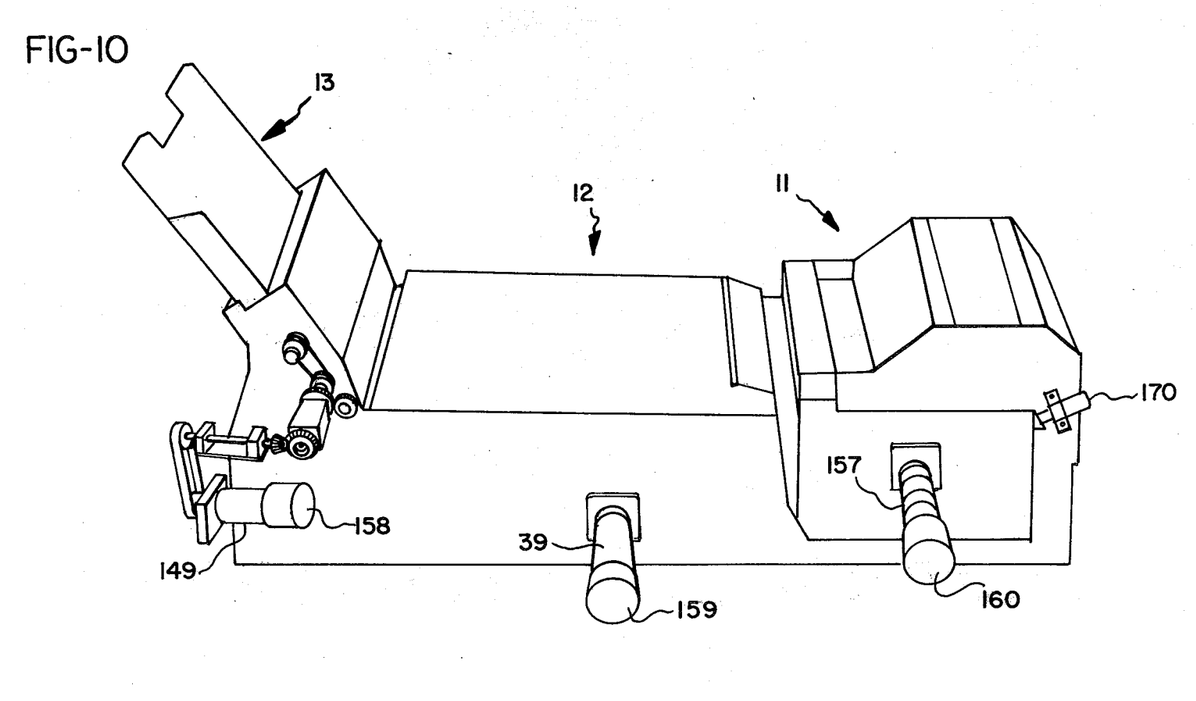
FIG. 10 is a partial schematic pictorial view illustrating typical paper drive and scanning control mechanisms on the back side of a scanning system as illustrated in FIG. 1.

Gate solenoid 170 (FIG. 6) actuates a conventional crank arm rotating actuating rod 171 fastened to the gate fingers and moves the fingers comprising gate 26 away from, or next to, drum 27 as programmed in the controller. In the closed position, as illustrated in FIGS. 3, 5, and 9, documents are discharged on the first pass to the receiving tray. In the open position, as illustrated in FIG. 2, documents are passed to the second-side scanning exposure glass 32. Solenoid 170 is controlled in accord with whether simplex scanning or duplex scanning is desired and with the document feed velocity and position as documents pass through the device. As illustrated in FIG. 10, typically three primary drive servo motors are used. Motor 149 operates the feeder mechanism in feeder 13 and the paper transport mechanism in platen cover 12; motor 39 operates the scanner drive mechanism; and motor 157 operates the drive mechanism and drum in scanning station 11. Each has an attached shaft angle position encoder 158, 159, and 160, respectively, to provide the feedback information for moving and positioning the documents. The previously mentioned data processing system receives information signals from the encoders and other previously mentioned sensors to control the servo motors so as to provide an even flow of documents at a uniform velocity through the device in accord with the document handling mode selected.

While the form of apparatus herein described constitutes the preferred embodiment of the invention, it is to be understood that the invention is not limited to this precise form of apparatus, and that changes may be made therein without departing from the scope of the invention.

What is claimed is:

1. Apparatus for presenting an original document to a first scanning station and thence transporting said document alternatively either directly to an output tray or to a second scanning station, followed by movement to said output tray, said apparatus comprising:
    a. a frame;
    b. a lid hingedly connected to said frame;
    c. a document transport assembly hingedly connected to said frame and housed within said lid for transporting said document in a first direction past said first scanning station and thence continuing generally in said first direction toward said output tray;
    d. a rotatable document reversing drum hingedly connected to said frame and housed within said lid separate from and cooperable with said document transport assembly for receiving said document from said document transport means, inverting said document, transporting said document in a second direction opposite said first direction for presentation to said second scanning station, and returning said document to said document transport assembly for movement to said output tray;
    e. gate means for selectively removing said document from said drum and directing said document to said output tray; and
    f. means for enabling said transport assembly to be latched to said lid such that both may be raised to an upwardly hinged position together.

2. Apparatus according to claim 1 wherein said gate means comprises a plurality of spaced gate members housed as a unit with said drum and supported about a pivot axis extending parallel to the axis of rotation of said drum.

3. Apparatus according to claim 2 wherein said transport assembly comprises a first plurality of endless belts extending generally parallel to said first and second directions and supported in spaced relation for conformance about said drum and interdigitation with said gate members.

4. Apparatus according to claim 3 wherein said transport assembly comprises a second plurality of endless belts interdigitated with said first mentioned plurality of endless belts and positioned for carrying said document from said first scanning station to a point at the top of said drum.

5. Apparatus according to one of claims 1 through 4 wherein said drum is supported for upward hinging through an angle of about 38 degrees.

6. Apparatus according to one of claims 1-4 wherein said first scanning station comprises a transparent support member for supporting and exposing said document during passage therepast and said document transport assembly comprises a guide member for urging said document toward said support member, a first pair of drive rolls for feeding said document into the space between said support member and said guide member, a second pair of drive rolls for removing said document from the space between said support member and said guide member, and means for blowing a flow of air into the space between said support member and said guide member.

7. Apparatus for exposing a sheet-type original document comprising:
    a transparent support member for supporting and exposing said document during passage therepast,
    a guide member for urging said document toward said support member,
    a first pair of segmented drive rolls for feeding said document into the space between said support member and said guide member,
    a second pair of segmented drive rolls for removing said document from the space between said support member and said guide member,
    a plenum chamber disposed above said support member between said first and second pairs of drive rolls and having openings for directing air downwardly onto said guide member so as to direct a leading edge of a sheet-type document into said first drive rolls, said plenum chamber also have openings for directing air through said first and second segmented drive rolls against said document so as to force said document against said support member; and fan means connected to said plenum chamber for providing an air supply thereto.

8. Apparatus for presenting an original document to a first scanning station and thence transporting said document alternatively either directly to an output tray or to a second scanning station, followed by movement to said output tray, said apparatus comprising:
 a. a frame;
 b. a lid hingedly connected to said frame;
 c. a document transport assembly hingedly connected to said frame and housed within said lid having a first portion for transporting said document in a first direction past said first scanning station for scanning a first side of said document;
 d. a rotatable drum hingedly connected to said frame and housed within said lid separate from said document transport assembly; wherein,
 (i) said drum is spaced from said first scanning station in said first direction;
 (ii) said drum has a peripheral surface for receiving said document after transport through said first scanning station;
 (iii) with the upper region of said peripheral surface at any selected rotation of said drum being adjacent to a second portion of said document transport assembly for cooperation with said second portion for continued transport of said received document in generally said first direction and with the lower region of said peripheral surface at any selected rotation of said drum being adjacent to said second scanning station; and
 e. gate means having:
 (i) a selective first position for removing said document from said peripheral surface of said drum for continued transport of said document generally in said first direction toward an output tray; and
 (ii) a selective second position for permitting said document to remain on said peripheral surface of said drum for continued transport of said document past said second scanning station in a second direction opposite to said first direction thereby inverting said document for scanning of an opposite second side thereof at said second scanning station and then transporting said document generally in said first direction to said gate means for said selective first position removal of said document.

* * * * *